(12) United States Patent
Ringermacher et al.

(10) Patent No.: US 8,692,887 B2
(45) Date of Patent: Apr. 8, 2014

(54) THERMAL IMAGING METHOD AND APPARATUS FOR EVALUATING COATINGS

(75) Inventors: Harry Israel Ringermacher, Delanson, NY (US); Donald Robert Howard, Troy, NY (US); Bryon Edward Knight, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 452 days.

(21) Appl. No.: 12/869,893

(22) Filed: Aug. 27, 2010

(65) Prior Publication Data

US 2012/0050537 A1 Mar. 1, 2012

(51) Int. Cl.
*H04N 7/18* (2006.01)
*H04N 5/33* (2006.01)

(52) U.S. Cl.
USPC ............... 348/164; 348/86; 348/92; 348/128; 374/5; 374/121

(58) Field of Classification Search
None
See application file for complete search history.

(56) References Cited

U.S. PATENT DOCUMENTS

| | | | | |
|---|---|---|---|---|
| 4,679,946 A * | 7/1987 | Rosencwaig et al. | ............. | 374/5 |
| 5,711,603 A * | 1/1998 | Ringermacher et al. | ........... | 374/5 |
| 5,719,395 A * | 2/1998 | Lesniak | ........ | 250/330 |
| 6,367,968 B1 * | 4/2002 | Ringermacher et al. | .......... | 374/7 |
| 6,367,969 B1 * | 4/2002 | Ringermacher et al. | .......... | 374/7 |
| 6,394,646 B1 * | 5/2002 | Ringermacher et al. | .......... | 374/7 |
| 6,407,512 B1 * | 6/2002 | Yoshida et al. | ............ | 315/241 P |
| 6,515,284 B1 * | 2/2003 | Walle et al. | ................ | 250/341.6 |
| 6,517,236 B2 * | 2/2003 | Sun et al. | ........................... | 374/4 |
| 6,537,605 B1 * | 3/2003 | Kirchner et al. | ................... | 427/8 |
| 6,542,849 B2 * | 4/2003 | Sun | .............................. | 702/172 |
| 6,543,849 B1 * | 4/2003 | Yamada | ....................... | 297/363 |
| 6,575,620 B1 * | 6/2003 | Banaszak et al. | ................. | 374/4 |
| 6,593,705 B1 * | 7/2003 | Rudd et al. | ................ | 315/241 R |
| 6,712,502 B2 * | 3/2004 | Zalameda et al. | ................. | 374/5 |
| 6,856,765 B2 * | 2/2005 | Okubo | ............................ | 396/88 |
| 7,064,331 B2 * | 6/2006 | Rothenfusser et al. | .... | 250/341.6 |
| 7,129,492 B2 * | 10/2006 | Saito et al. | ................. | 250/341.6 |
| 7,186,981 B2 * | 3/2007 | Shepard et al. | ............. | 250/341.1 |
| 7,409,313 B2 * | 8/2008 | Ringermacher et al. | ...... | 702/172 |
| 7,419,298 B2 * | 9/2008 | Ouyang et al. | ..................... | 374/5 |
| 7,425,093 B2 * | 9/2008 | Wickersham et al. | ............ | 374/5 |
| 7,538,938 B2 * | 5/2009 | Sun | ............................... | 359/359 |
| 7,549,789 B2 | 6/2009 | Tralshawala et al. | | |
| 7,632,012 B2 * | 12/2009 | Twerdochlib | ................. | 374/129 |
| 7,690,840 B2 * | 4/2010 | Zombo et al. | ................. | 374/121 |
| 7,773,209 B2 * | 8/2010 | Hackney et al. | ............ | 356/237.1 |
| 2002/0031164 A1 | 3/2002 | Scheidt et al. | | |
| 2005/0018748 A1 * | 1/2005 | Ringermacher et al. | ....... | 374/121 |
| 2008/0144049 A1 | 6/2008 | Ringermacher et al. | | |

FOREIGN PATENT DOCUMENTS

EP 1852697 A1 11/2007

* cited by examiner

*Primary Examiner* — Sath V Perungavoor
*Assistant Examiner* — Matthew J Anderson
(74) *Attorney, Agent, or Firm* — Jason K. Klindtworth (57) ABSTRACT

An apparatus is provided for determining variable thickness of a coating on a surface of a substrate using in part a flash-lamp source, capable of generating a thermal pulse at the coating surface, and a image capture and processing device capable of capture sequential image frames of the coating surface, whereas each sequential image frame corresponds to an elapsed time and comprises a pixel array, and wherein each pixel of the array corresponds to a location on the coating surface. A method of calculating coating thickness is also provided.

14 Claims, 5 Drawing Sheets

THERMAL IMAGING METHOD AND APPARATUS FOR EVALUATING COATINGS

BACKGROUND

The present invention in accordance with certain embodiments, relates to thermographic nondestructive testing techniques for determining the thickness of a coating on the surface of an object In general, infrared (IR) transient thermography is a versatile nondestructive testing technique that relies upon temporal measurements of heat transference through an object to provide information concerning the structure and integrity of the object. Heat flow through an object is substantially unaffected by the microstructure and the single-crystal orientations of the material of the object, therefore, an infrared transient thermography analysis is essentially free of the limitations this creates for ultrasonic measurements. Additionally, transient thermographic analysis approach is not significantly hampered by the size, contour or shape of the object being tested and, moreover, can be accomplished ten to one-hundred times faster than most conventional ultrasonic methods, particularly when testing objects with large surface areas.

Conventionally, an infrared (IR) video camera has been used to record and store successive thermal images (frames) of an object surface after heating it. Each video image is composed of a fixed number of pixels, which may be defined as a pixel array, whereby each pixel represents a small picture element in an image array or frame. Each pixel corresponds to a rectangular area, called a resolution element, on the surface of the object being imaged. Because, the temperature at each resolution element is directly related to the intensity of the corresponding pixel, temperature changes at each resolution element on the object surface can be analyzed in terms of changes in pixel contrast.

One known contemporary application of transient thermography is the ability to determine the size and relative location (depth) of flaws within solid non-metal composites; another application of transient thermography is for determining the thickness of metal objects. Some attempts have been made to measure the thickness of insulative coating as well. These include modeling techniques where the insulative coating thickness may be obtained by fitting the coating data to a model and comparing it with known thickness standards. Unfortunately, these techniques either include point-by-point measurement of the coating thickness, and therefore take time and are complex computationally or require the presence of a coating thickness standard in the image, which may not be possible or is unfeasible. Another aspect to thickness measurement for insulative coatings is that as the coating ages the thermal conductivity of the coating changes and affects the thickness measurement of the coating.

Using thermal conductivity as one factor in determining coating thickness has been achieved. The method includes obtaining a respective time-temperature response for an insulative coating and for a substrate, where the insulative coating is disposed on the substrate. The method also includes measuring a delta log value and measuring an inflection point value from the respective time-temperature response for the coating and for the substrate. These values are described in more detail with reference to equations herein below. One or more coating characteristics may be calculated using the delta log value or the inflection point value. A thermal conductivity value and a coating thickness value using both of the coating characteristic values is then possible.

However, the method is limited as the calculation is done at a specific point along the surface of the coated part. The ability to analyze variations in the coating thickness along a large surface area or geometrically complex parts is limited. Therefore, there is a need for a technique that can measure quantitatively, the absolute thickness for a coating over a large or varied surface area.

BRIEF DESCRIPTION

According to one aspect of the present invention, an apparatus is provided for determining variable thickness of a coating disposed on a substrate. The apparatus comprises a flash-lamp source capable of generating a thermal pulse at the coating surface, an optical trigger coupled to the flash-lamp source and capable of initiating the flash-lamp firing, a transistor coupled to the flash lamp source and capable of quenching the thermal pulse, and a reflective filter positioned between the flash-lamp source and the coating surface capable of preventing residual heat from the flash-lamp from heating the coating surface. The apparatus also comprise an IR image capture to capture sequential image frames of the coating surface, whereas each sequential image frame corresponds to an elapsed time and comprises a pixel array, and wherein each pixel of the array corresponds to a location on the coating surface, and a processor for controlling the operations of the lamp, receiving the image frames of the coating surface at the initiation of the flash-lamp firing and sequentially there after, and for calculating the thickness of the coating at various points along the substrate using the data received.

According to another aspect of the present technique, a method for determining the thickness of a coating at various points along the surface of a substrate is provided. The method comprises generating a short duration thermal pulse at the coating surface using a flash-lamp source equipped with a reflective filter to preventing residual heat from the flash-lamp from heating the coating surface, and capturing sequential image frames of the coating surface using an IR capture device, whereas each sequential image frame corresponds to an elapsed time and comprises a pixel array, and wherein each pixel of the array corresponds to a location on the coating surface. The thickness and thermal conductivity of the coating is then calculated from independently generating a time-temperature response curve for two or more pixels of the pixel array.

DRAWINGS

These and other features, aspects, and advantages of the present invention will become better understood when the following detailed description is read with reference to the accompanying drawings in which like characters represent like parts throughout the drawings, wherein:

FIG. 4 is a representation of coating thickness variations of a substrate; A is a reference image and B is the coating image obtained using the system of FIG. 1.

DETAILED DESCRIPTION

By way of example, the present invention relates to non-destructive testing methods and apparatus for determining and displaying the actual thickness and the thermal conductivity value of a coating along the surface an object through the use of high-speed infrared (IR) transient thermography. The temporal response of the surface temperature following an optical surface flash and consequent heat pulse generation is analyzed and the coating thickness extracted. A by-product is the coating thermal conductivity.

Figure 1:
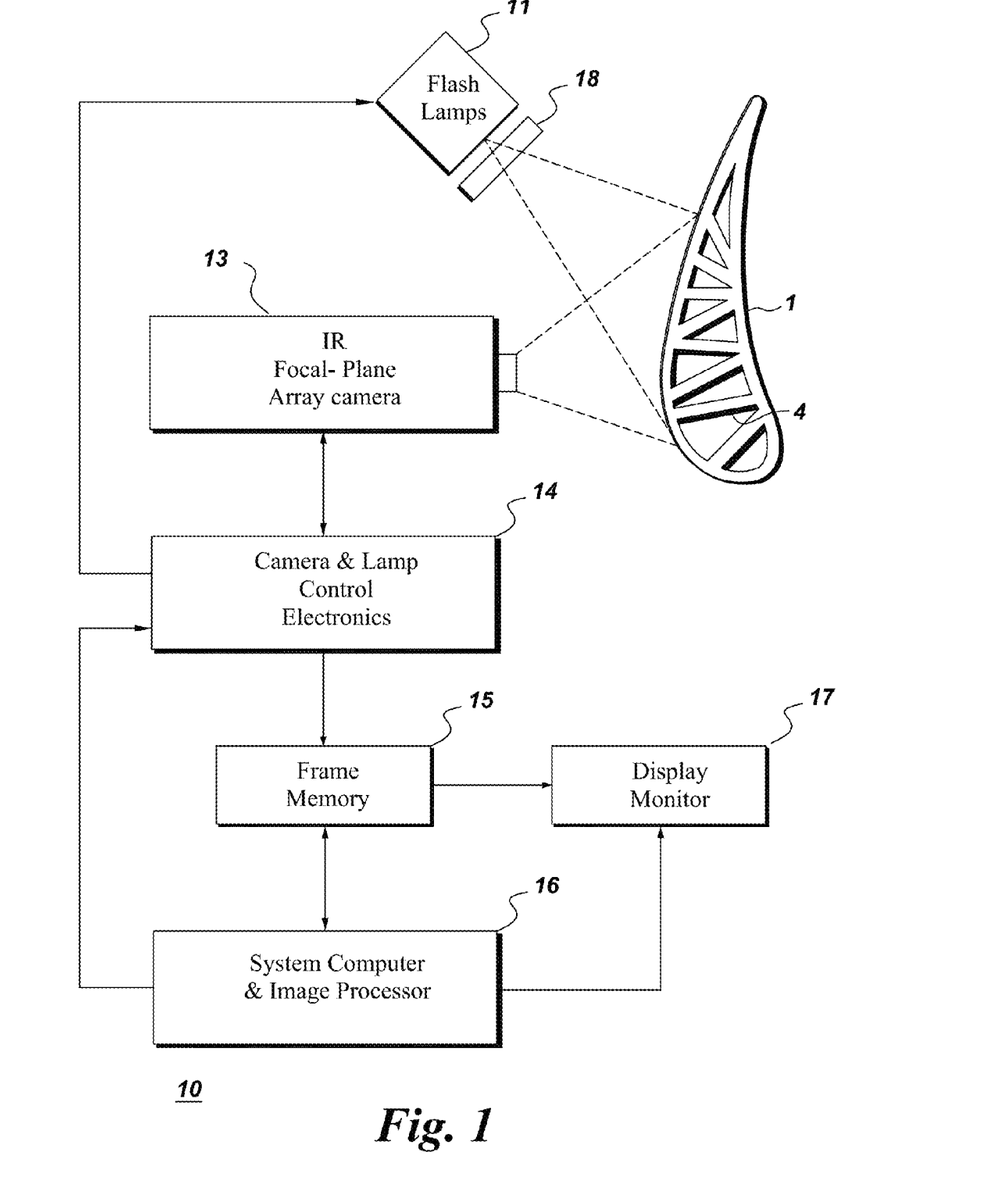
FIG. 1 is a diagrammatic representation of an exemplary infrared transient thermography system for determining and displaying the thickness and thermal conductivity of an insulative coating, in accordance with an aspect of the present invention.

FIG. 1 is a diagrammatic representation of an apparatus 10 for determining coating thickness and thermal conductivity for an object 1. More specifically, the exemplary apparatus of FIG. 1 can be used to determine the thickness and thermal conductivity of a coating 4 disposed on a surface of the object using transient IR thermography. The object may be a fabricated part including, but not limited to an aircraft or turbine part. In certain embodiments, the fabricated part may be an airfoil, rib, or spar design wherein measuring coating thickness is an important quality control and accurate measurements might be hindered due to rib-like structures or closely spaced back wall or internal structures. The coating 4 in one example is a thermal barrier coating (TBC), and in another example the coating 4 is an environmental barrier coating (EBC).

As shown in FIG. 1, a flash-lamp heat-pulse source 11 is used to rapidly heat the surface of the object being measured. This generates a thermal pulse at the coating surface that propagates into the coating.

One suitable arrangement for flash-lamp heat-pulse source 11 would be, for example, a set of four or eight high-speed, high output power photographic flash-lamps, each capable of about 4.8 Kilo-joules output and having individual power supplies (such as, for example, flash-lamps manufactured by Speedotron, Corp. in Chicago, Ill.).

Since metals have a significantly faster rate of heat conduction than non-metals, the characteristic times for heat flow in metals are much faster than those of, for example, plastic or composite materials. Consequently, in attempting to adapt conventional IR thermography techniques (ordinarily limited to non-metals) to metals, a sharp cutoff in the applied heat is needed. In order to obtain this, a 3-5 micron reflective filter 18 is used between flash-lamps 11 and object of interest 1 so as to prevent exposing the object to residual heat as the flash lamps cool down after exposure. In certain embodiments the reflective filter may be integrated into the flash lamp as a lens cover.

In practice, one or more filters may be used (e.g., one per each flash-lamp). These filters act to prevent direct long wave radiation X typically generated from the "afterglow" of overheated metallic elements in the flash-lamps X from ever leaving the flash-lamps and impinging on the target or otherwise reflecting back into focal-plane array camera 13. Such primary afterglow radiation from flash-lamps 11 competes and can interfere with the long-wave IR emissions from the targeted object during early thermal data acquisition, thus obscuring the true target-generated IR radiation and reducing ultimate image contrast and quality. Thus, the use of these special filters produces a sufficiently sharp heat pulse to enable the shorter heat travel time in metal to be detected.

In the example embodiment depicted in FIG. 1, the reflective filter 18 may be composed of Pyrex™, fused quartz, BK7™, B270™, or other optical material that is transparent to visible and UV light and is coated on the flash-lamp facing side with an infrared-reflective coating to reflect all radiation in the 3-5 micron range back into the flash-lamps. In certain embodiment, optical glass and coated filters may be acquired or specially manufactured by a general scientific optics and optical glass manufacturer such as, for example, Oriel in Stratford, Conn.

Surface temperature measurements of heat-pulse illuminated object 1 are acquired using a infrared (IR) sensitive imaging system comprising an IR sensitive focal-plane array camera 13 such as an SC-series camera available from FLIR (Boston, Mass.), control electronics 14, frame data memory 15, control computer/image processor 16 and display monitor 17.

Acquisition of thermal data is preferably initiated at the time of flash lamp firing either by optical triggering or by other suitable means. Flash lamp firing is controlled via control electronics 14 managed by conventional video frame acquisition software running on system computer and image processor 16 such as provided by conventional frame acquisition and flash-lamp control software.

Quenching is also used to actively control the duration of the flash. In certain embodiments, quenching may be accomplished using a transistor coupled to the lamp and controlled by a processor. The transistor may be included in the lamp control electronic 14 (FIG. 1). The transistor may cut off the current to the flash lamp, after firing at a preset time to produce a short light pulse. Preferably, the short light pulse duration is less than 4 milliseconds and more preferably between 2-3 milliseconds. The cut off time may vary based on the efficiency of the lamp and electronic systems. Quenching provides a short controlled light pulse, which relates to more control of the thermal response of the coating and therefore increased accuracy in the data acquisition across the entire pixel array.

The system control computer/image processor 16 is a specially programmed general purpose digital computer that is capable of peripheral equipment control and communication functions in addition to digital image processing and display in accordance with the method of the present invention. System processor 16 controls the electronics 14 for the camera and lamp, including quenching, and frame data memory to acquire a predetermined number of successive thermal image frames of the object surface which are stored and recorded in memory 15 for future analysis.

In certain embodiments, before beginning the thermal imaging process, IR array camera 13 may be calibrated using a "full-field" dual-image calibration. In other embodiments, any calibration technique that results in producing maximum uniformity of the image field which is important for high contrast imaging and obtaining improved thermal accuracy can be used.

Each image frame acquired during the imaging process consists of N×N pixels, each pixel corresponding to a resolution element on the object surface where N is typically 256, 512 or 1024 depending on the resolution and accuracy desired. Each pixel occupies about two bytes of storage memory and may be represented, for example, by a 12-bit or larger binary number. The stored image frames are sequentially identified with increasing frame number values which together serve to provide a historical record of the temperature vs. time (T-t) characteristics of a front surface of object 1 for a predetermined period after being struck by the heat impulse imparted by flash lamp 11. In certain embodiments, the location of the pixel on the object surface may be registered or located using a two-dimensional or three-dimensional Cartesian coordinate system.

During evaluation of an object, after the processor 16 triggers the firing of flash-lamp(s) 11, image data frames are acquired from camera 13 and the IR intensity at each resolution element on the image is digitally recorded and stored in frame data memory 15. Data acquisition continues over a predetermined number of sequential image frames that are sufficient to acquire a meaningful T-t history over a duration of at least one estimated "characteristic time" for the material of the object. The total number of image frames acquired may vary depending on the accuracy and image resolution desired and can be as high as thousands of frames per second of data acquisition.

Frame data memory 15 may be a conventional digital memory internal to processor 16 or any suitable video frame data storage device accessible by processor 16. Each successive thermal image frame acquired is assigned an increasing frame number, Z, corresponding to the passage of real time. The resulting data frame "stack" is then analyzed taking a one-dimensional heat flow analysis approach, as outlined above. In accordance with this approach, the method of the present invention takes advantage of a known thermal invariance property evidenced in the temperature vs. time (T-t) history of each image pixel over successive IR image frames X that relies on identifying the location of an "inflection point" or peak-slope time, i.e., the point in time of maximum slope on the T-t data curve.

Figure 2:
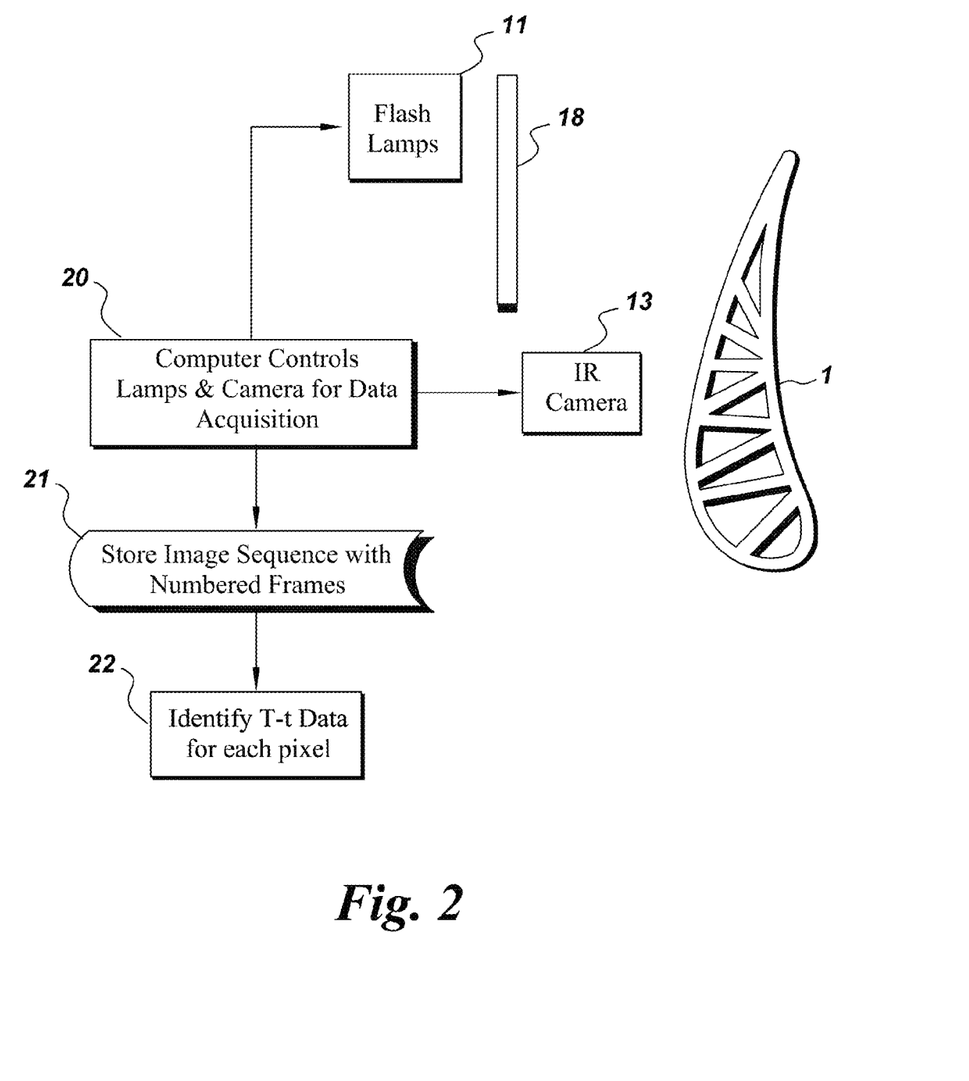
FIG. 2 is a is a flowchart illustrating exemplary steps for a non-destructive inspection method for determining thickness and thermal conductivity of an insulative coating, in accordance with an aspect of the present invention.

Referring now to FIG. 2, a flow diagram is presented that illustrates example processing steps for conducting transient IR thermography using thermal imaging techniques of the present invention. These steps may be implemented, for example, by appropriately programming the processor 16 (FIG. 1) using known conventional programming techniques.

Figure 3:
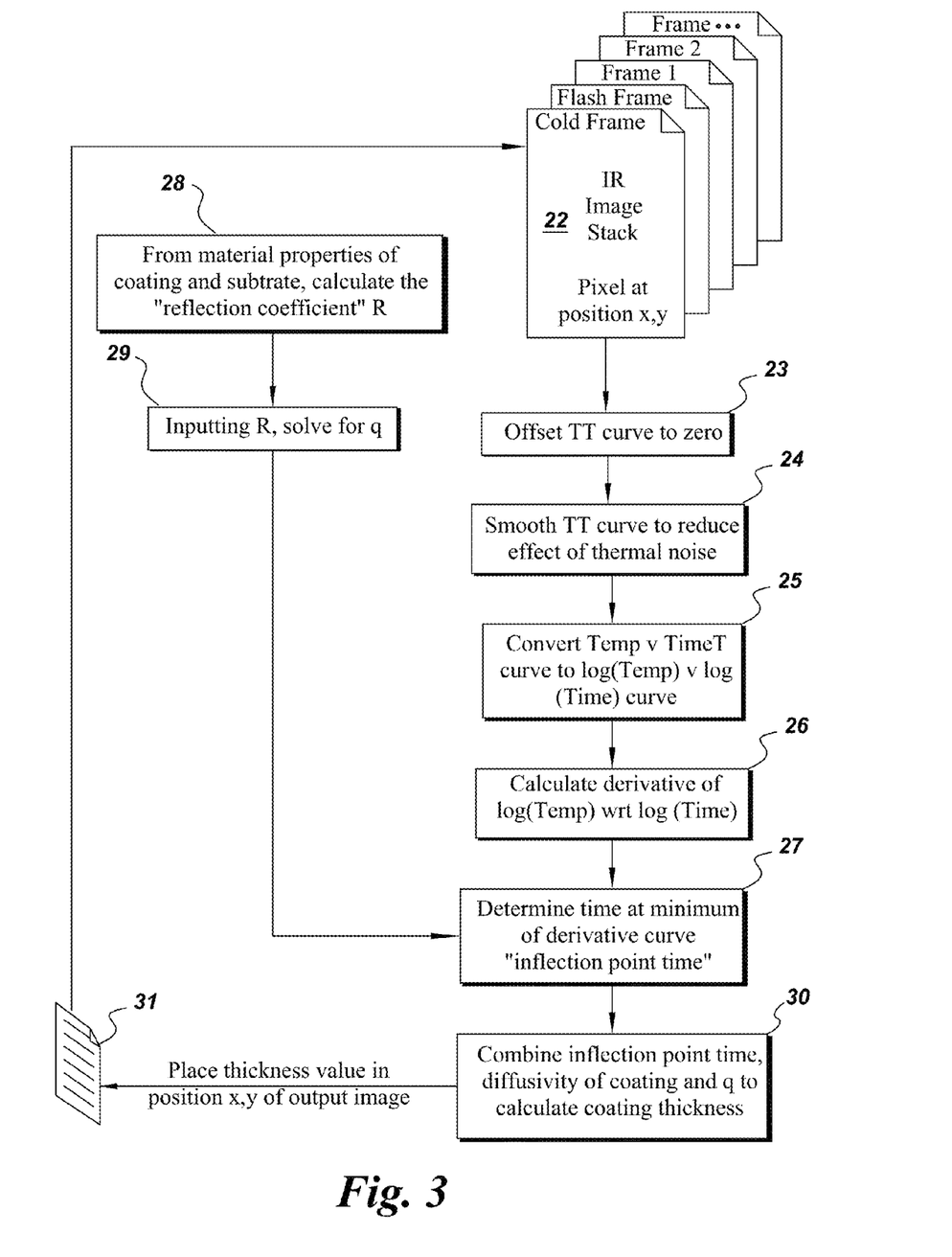
FIG. 3 is a flowchart continuing illustrating exemplary steps, which follows the steps illustrated in FIG. 2, in accordance with an aspect of the present invention.

Initially, as indicated at block 20, a region of interest on the object is identified, for example the IR camera is focused to capture the region of interest, and the system operator selects or inputs information concerning relevant parameters for examining the object. The relevant parameters may include for example, a thermal diffusivity coefficient for the material. Next, as indicated at block 20 in FIG. 2, the system control computer instructs the flash-lamp electronics to fire flash lamps 11, quench the lamps to produce a short light pulse, and initiate image frame data acquisition from the focal plane array IR camera 13. Data acquisition proceeds over a predetermined number of sequential image frames and then, as indicated at 21, the image sequence, or IR stack is stored in frame memory 15 (shown in FIG. 1) after identifying each acquired image frame with a sequential frame number, Z to create an IR image stack As illustrated in FIG. 3 at step 22, each IR stack records the pixel value at each location. The extracted pixel value, from the same position on each image in the stack may be used to develop a temperature time curve based on frame number (TT curve) where a set of T-t curve data is identified for each pixel in the thermal image corresponding to each resolution element location over the region of interest on the surface of the object.

In certain embodiments, an offset Tt-curve 23 is generated where the offset value is zero. At this point, optional offset and scale (amplitude) adjustments 24 can also be made at this step to help compensate for any derogatory effects such as, for example, the effect of thermal noise.

In certain embodiments, as indicated at 24, a Gaussian function temporal smoothing of the contrast curve data may also be performed. In a preferred embodiment, a "temporal window" used in the Gaussian smoothing algorithm is made to vary as a function of time by making it proportional to the image frame number, Z, corresponding to the contrast data. Essentially, this smoothing "window" controls the full-width of the Gaussian at half-maximum (i.e., the "2-σ" width). Using a variable-width frame-number smoothing as described is more advantageous than a traditional Gaussian smoothing because it tends to compensate for the effects of heat diffusion at increasing depths within the material. Preferably, for this step, the width of the smoothing window at a selected data point is made proportional to the square-root of the image frame number at that point. In addition to the described variable-width frame-number Gaussian temporal smoothing, a number of software implemented "imaging filters" may also be applied to the contrast curve data at this stage, including spatial smoothing, initial and ending noise suppression, negative contrast suppression and contrast thresholding.

Next, as indicated at 25, the temperature versus time curve is converted to a log(temperature) versus log(time) curve. The derivative of the log(temp) with respect to log(time) may then be calculated 26 and shown in equation (12). This allows the time at minimum of the derivative curve (or maximum slope on the T-t data curve), referred to as the inflection point time, to be determined 27.

In certain other embodiments, the mathematical derivative of the contrast curve, indicative of the inflection point, is determined. It is well known that the point of maximum slope on a curve can be determined by using a conventional 3-consecutive-point derivative algorithm in which three equally spaced consecutive data points along the curve are sampled and used to calculate the slope of the curve at the second (middle) data point. In accordance with the present invention, three points may be used to determine the derivative of the contrast curve, but the separation of the first and third sample derivative points (i.e., the width of the derivative base interval) is linked to real time in the image evolution via the image frame number. Specifically, the width of the derivative base interval at any selected point along the contrast curve is made proportional to the square-root of the IR image frame number, Z.

In this manner, the signal-to-noise (S/N) characteristics are maximized even in the midst of high noise levels. This improvement in the S/N ratio results from "sampling" over a larger interval and, thus, detects the largest signal change rather than the differential change traditionally obtained with fixed-width 3-point differentiation. Since a maximum S/N ratio is obtained when the sample point separation is equal to the full Gaussian width, the maximum possible S/N ratio is always achieved by using the frame-number proportional-width approach of the present invention.

In order to determine the thickness value for the coating from the measured data as obtained from system 10, certain calculations are undertaken by the processor 16 using the inflection point time as determined in step 27 in combination with the diffusivity of the coating, as defined by the reflection coefficient R as well as the density, $\rho$, and specific heat, $c_c$, of the coating.

Since density and specific heat of the coating do not vary significantly upon aging, the product of these two values can be taken to be a constant as shown by equation (1):

$$\rho c_c = \text{constant} \qquad (1)$$

As explained with reference to FIG. 1, the thermal waves penetrate the coating and are reflected off the coating/substrate interface, with a reflection coefficient or reflectivity value, R given by equation (2):

$$R = \frac{E_c - E_s}{E_c + E_s} \quad (2)$$

where $E_c$ and $E_s$ are respectively the coating and substrate "effusivity" given by:

$$E_c = \sqrt{K_c \rho c_c} \quad E_s = \sqrt{K_s \rho c_s} \quad (3)$$

where $K_c$ is the thermal conductivity for the coating and $K_s$ is the thermal conductivity for the substrate. In one example, the units for measuring include g/cm³ for density (ρ), cal/g-° C. for specific heat c and cal/s-cm-° C. for thermal conductivity.

The temperature-time response of the coating/substrate system at the surface of the coating, following the flash may, may be expressed mathematically as:

$$T(t) = \left(1 + 2\sum_{n=1}^{\infty} R^n e^{-n^2 \frac{\tau_c}{t}}\right) T_{1/2c}(t) \quad (4)$$

where $T_{1/2c}$ is a "half-space" response of the coating to the flash pulse, given by equation (6), $\tau_c$ is the "characteristic time" of the coating of thickness L and thermal diffusivity $\alpha_c$ given by:

$$\tau_c = \frac{L^2}{\alpha_c} \quad (5)$$

The half-space function, shown in equations (6) and (7) is a "one over root-time" temperature response to a thermal impulse at the surface of an infinite "half-space" of coating or substrate. The response function as shown by equation (4) moves from the coating half-space shown by equation (6) at t=0 to the substrate half-space shown by equation (7) at t=∞.

$$T(t) \rightarrow T_{1/2c}(t) = \frac{1.1284 I}{2 E_c \sqrt{t}} \, t \rightarrow 0 \quad (6)$$

$$T(t) \rightarrow T_{1/2s}(t) = \frac{1.1284 I}{2 E_s \sqrt{t}} \, t \rightarrow \infty \quad (7)$$

This may be shown by taking the infinite sum in equation (4) in the limits as t->0 and t->∞ using the definition of R from equation (2).

In one example, the log difference near t=0 is defined as "delta log":

$$\text{delta log} = \log[T_{coating}(t=0)] - \log[T_{substrate}(t=0)]. \quad (8)$$

From equations (6) and (7), the ratio of the coating effusivity to the substrate effusivity in terms of delta log:

$$\frac{E_c}{E_s} = 10^{-deltalog}. \quad (9)$$

The reflectivity value can also be defined from delta log:

$$R = \frac{1 - 10^{deltalog}}{1 + 10^{deltalog}}. \quad (10)$$

The inflection point, in time, can be derived theoretically by differentiating the T-t curve shown by equation (4), and setting the result to zero. Then an equation (12) given below is solved to find the point in time of maximum slope (inflection time, "$t_{inflection}$") by using a variable "q". It may be noted that "q" is defined as:

$$q \equiv \frac{\tau_c}{t_{inflection}} \text{ or } \tau_c = q t_{inflection} \quad (11)$$

where $\tau_c$ is the coating characteristic time.

An equation to solve for "q" is given by:

$$q \left[\frac{\sum_{n=1}^{3} R^n n^4 e^{-n^2 q}}{\sum_{n=1}^{3} R^n n^2 e^{-n^2 q}}\right] - 2q \left[\frac{\sum_{n=1}^{3} R^n n^2 e^{-n^2 q}}{1 + 2\sum_{n=1}^{3} R^n e^{-n^2 q}}\right] - 1 = 0 \quad (12)$$

As such, an input to equation (12) is a value for R, which is obtained from equation (10). As shown further in FIG. 3, R may be determined from the material properties of the coating and substrate, step 28 and calculated according to equation 10. In certain embodiments, R may also be inputted from prior experimental data obtained from the same coating and substrate combination and flash pulse. The value of R may then be inputted to solve for q, step 29. Having found the variable q from equation (12), and the inflection point or inflection time "$t_{inflection}$" of the T-t curve experimentally, the inflection time may be then be used in equation (11) to determine the coating characteristic time $\tau_c$.

The thermal diffusivity for the coating, $\alpha_c$, is defined as:

$$\alpha_c \equiv \frac{K_c}{\rho c_c} \quad (13)$$

Thermal conductivity $K_c$ is found from the definition of coating effusivity in equation (3):

$$K_c = \frac{E_c^2}{\rho c_c} \quad (14)$$

since $\rho c_c$ is known from (1) and $E_c$ from equation (9), we can determine $\alpha_c$ as given by equation (13).

Finally, step 30, the coating thickness, L, is then determined from equation (5) denoting the actual thickness of the object at the location of the resolution element corresponding to the analyzed pixel as shown in equation 15:

$$L = \sqrt{\alpha_c \tau_c} \quad (15)$$

The thickness value, L, may be stored, step 31, in memory of the processor 16. The next pixel is then selected, as indicated at 31, and the above steps are reiterated for each pixel comprising the IR image.

The process is repeated for the other selected pixels. In certain embodiments, the stored values may be used to build a color-mapped or gray-scale image of the region of interest on the object surface for display or print each color or gray shade corresponding to a particular thickness. In addition to the steps outlined above, the input and selection of various parameter values such as diffusivity constant, data analysis starting point and range, temporal smoothing window size range, and color mapping range are automated for accuracy and consistency through appropriate conventional programming of the system control computer. It is noteworthy that since this method is "absolute" requiring only the thermal properties of the involved materials and the measurements described, no reference coating standards are necessary.

By conducting the transient thermography analysis using the above described steps for thermal data acquisition and analysis in conjunction with the above described apparatus in accordance with the present invention, coating thickness values can be accurately obtained even between closely spaced back wall or internal structures that may form a part of the tested object, for example the rib-like structures often found in turbine air foils (as depicted in FIGS. 1 and 2), whereas using traditional thermal or ultrasonic methods such closely positioned back-wall structures would normally result in distorted data or require destructive testing for accurate measurements.

Figure 4A:
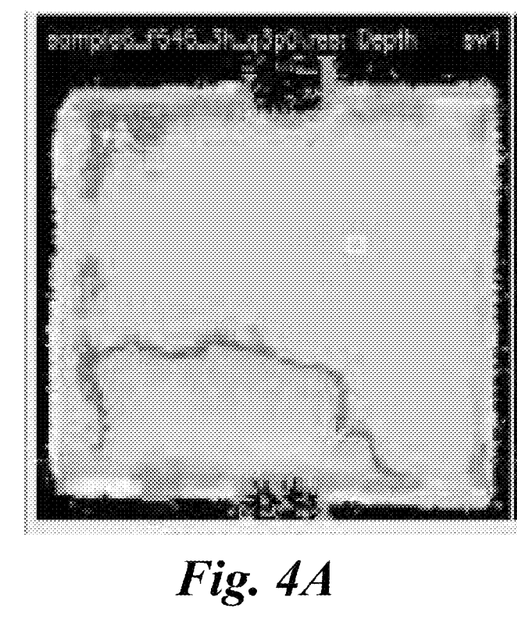
Figure 4B:
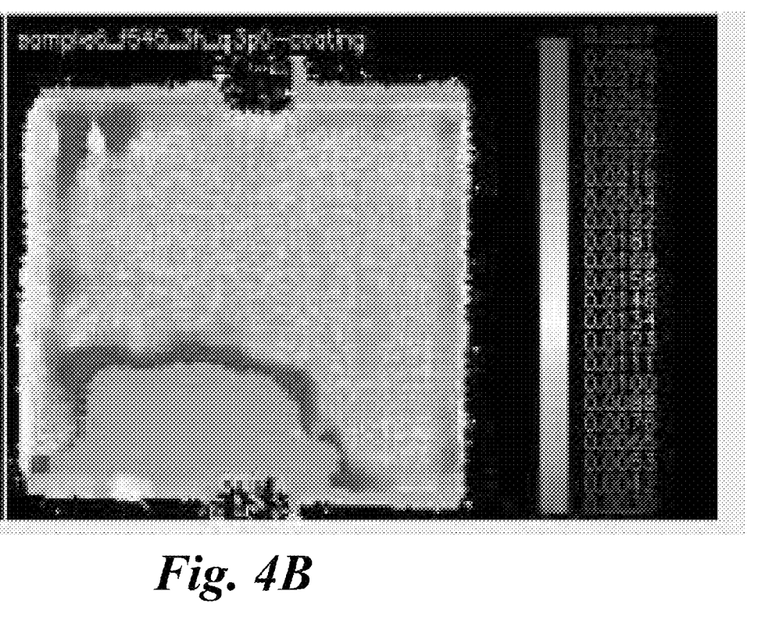
Figure 5:
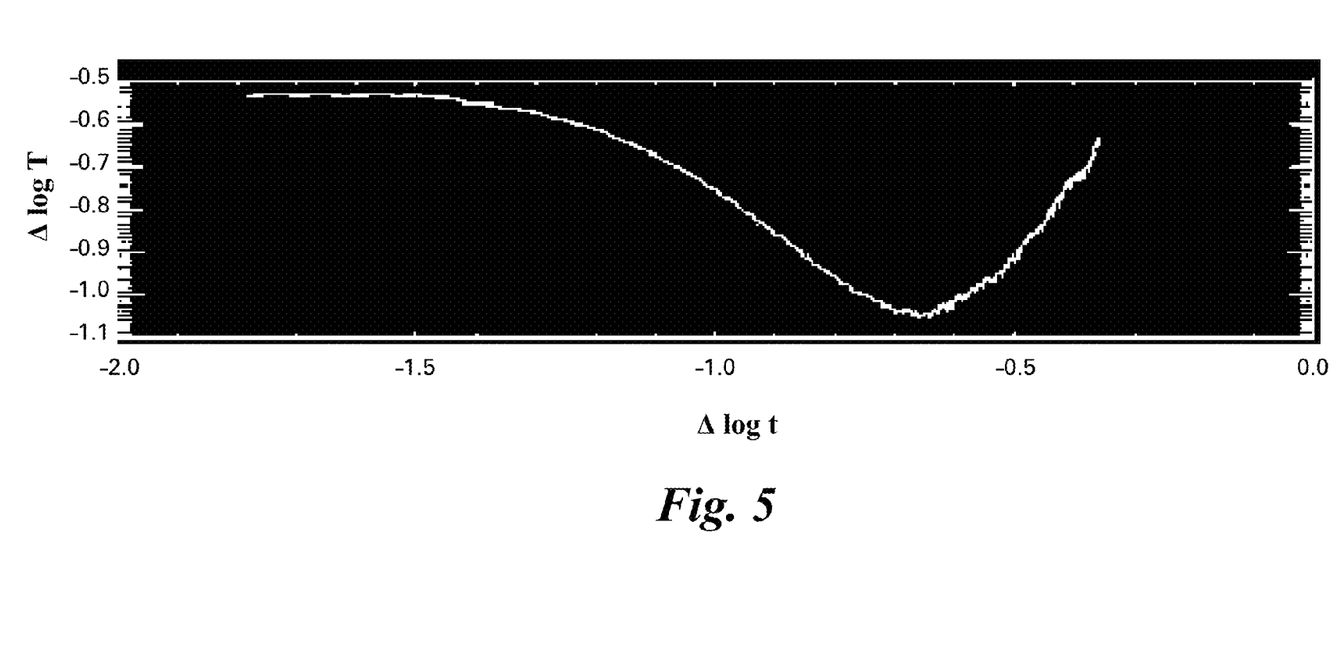
FIG. 5 is another simulated graphical representation of the inflection point response of the coating at the pixel location identified in FIG. 4 as the point of minimum slope of the derivative of the log(temp) with respect to log(time) curve.

FIGS. 4 and 5 shows results of the thermography analysis using the apparatus described in FIG. 1. A ceramic coupon was spray coated with an EBC to obtain a coating having an approximate thickness of 0.02 inches. The coated coupon was then subjected to a short duration flash pulse. FIG. 4A is the reference image generated using the process while FIG. 4B shows variation in coating thickness indicated by a different gray tone color in the generated image. The gray tone corresponds to a like color or shade in the bar-scale thickness key displayed at the right of the image. As shown delamination occurred in the bottom left quadrant; which is often a critical assessment in quality control testing. An individual pixel point on the coupon (FIG. 4A) was selected, shown as a highlighted square right of center, coating thickness at this area was calculated to be 0.0212 inches. The inflection point, of the selected pixel, is shown in FIG. 5 as the point of minimum slope of the derivative of the log (temp) with respect to log(time) curve. Using this method, absolute coating thickness values and variations is accurately obtained across the entire part.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An apparatus for determining variable thickness of a coating disposed on a substrate, the apparatus comprising:
a flash-lamp source capable of generating a thermal pulse at the coating surface;
an optical trigger coupled to the flash-lamp source and capable of initiating the flash-lamp firing;
a transistor coupled to the flash lamp source and capable of quenching the thermal pulse;
a reflective filter positioned between the flash-lamp source and the coating surface capable of preventing residual heat from the flash-lamp from heating the coating surface;
an IR image capture device positioned to capture sequential image frames of the coating surface, where each sequential image frame corresponds to an elapsed time and comprises a pixel array, and wherein each pixel of the array corresponds to a location on the coating surface;
a processor coupled to the IR image capture device, wherein the processor is programmed to:
control the operation of the optical trigger and transistor;
receive the image frames of the coating surface at the initiation of the flash-lamp firing and sequentially there after; and
determine the thickness of the coating at selected points along the substrate using the sequential image frames to calculate a logarithmic time-temperature response curve for each pixel in the array corresponding to each of the selected points, to calculate an inflection point time for each logarithmic time-temperature response curve, wherein a time of maximum slope on the time-temperature response curve is defined as the inflection point time, and to select a temperature response for each pixel in the array corresponding to each of the selected points only at its corresponding inflection point time.

2. The apparatus of claim 1 wherein the IR image capture device comprises an infrared focal plane array camera.

3. The apparatus of claim 1 wherein the reflective filter is coated directly on the flash-lamp source and capable of reflecting radiation in the 3 to 5 micron range.

4. The apparatus of claim 1 wherein the coating is at least one of thermal barrier coating or environment barrier coating.

5. The apparatus of claim 1 further comprising a display device capable of projecting an image of the coating thickness along the substrate.

6. A method for determining the thickness of a coating at various points along the surface of a substrate comprising:
generating a short duration thermal pulse at the coating surface using an optical trigger-initiated flash-lamp source equipped with a reflective filter to prevent residual heat from the flash-lamp source from heating the coating surface;
capturing sequential image frames of the coating surface using an IR capture device, where each sequential image frame corresponds to an elapsed time and comprises a pixel array, and wherein each pixel of the array corresponds to a location on the coating surface;
processing the sequential image frames using a processor to store the sequential image frames; and
determining via the processor, the thickness and thermal conductivity of the coating along the substrate using the sequential image frames to calculate a logarithmic time-temperature response curve independently for two or more pixels of the pixel array, to calculate an inflection point time for each logarithmic time-temperature response curve, wherein a time of maximum slope on the time-temperature response curve is defined as the inflection point time, and to select a temperature response for each pixel in the pixel array only at its corresponding inflection point time.

7. The method of claim 6 wherein said time-temperature response curve is defined by an equation represented as:

$$T(t) = \left(1 + 2\sum_{n=1}^{\infty} R^n e^{-n^2 \frac{\tau_c}{t}}\right) T_{1/2c}(t)$$

where $T_{1/2c}$ is a half-space response of the coating to the flash pulse defined as $$T(t) \to T_{1/2c}(t) = \frac{1.1284 I}{2 E_c \sqrt{t}} t \to 0$$

$$T(t) \to T_{1/2s}(t) = \frac{1.1284 I}{2 E_s \sqrt{t}} t \to \infty;$$

and
R is a reflection coefficient defined as $$R = \frac{E_c - E_s}{E_c + E_s};$$

and
where $E_c$ is the coating effusivity and $E_s$ is the substrate effusivity defined as;

$$E_c = \sqrt{K_c \rho c_c} \text{ and } E_s = \sqrt{K_s \rho c_s};$$

where K is thermal conductivity, $\rho$ is density, and c is specific heat.

8. The method of claim 7 wherein the inflection point time ($t_{inflection}$) is measured experimentally from the time-temperature response curve and R is determined from the material properties of the coating and substrate.

9. The method of claim 8 wherein determining the variation in coating thickness comprises calculating a value for L at two or more pixels of the pixel array wherein L is defined as $$L = \sqrt{\alpha_c \tau_c}; \text{ where}$$

$\alpha_c$ is defined as $$\alpha_c \equiv \frac{K_c}{\rho c_c};$$

and
$\tau_c$ is a characteristic time of the coating defined as $$q \equiv \frac{\tau_c}{t_{inflection}};$$

and
q is defined as $$q \left[ \frac{\sum_{n=1}^{3} R^n n^4 e^{-n^2 q}}{\sum_{n=1}^{3} R^n n^2 e^{-n^2 q}} \right] - 2q \left[ \frac{\sum_{n=1}^{3} R^n n^2 e^{-n^2 q}}{1 + 2\sum_{n=1}^{3} R^n e^{-n^2 q}} \right] - 1 = 0.$$

10. The method of claim 6 wherein the short duration thermal pulse is less than 4 milliseconds.

11. The method of claim 10 wherein a Gaussian function temporal smoothing of the sequential image frame data is used to generate the time-temperature response curve.

12. The method of claim 11 wherein imaging filters are applied to the sequential image frame data said imaging filters comprises spatial smoothing, initial and ending noise suppression, negative contrast suppression, contrast thresholding, and combinations thereof.

13. The method of claim 6 further comprising displaying a color-coded or gray scale-coded image of the coating thickness along the substrate.

14. The method of claim 6 wherein the coating is at least one of thermal barrier coating or environmental barrier coating.

* * * * *